United States Patent
Drake et al.

[11] Patent Number: 6,164,605
[45] Date of Patent: Dec. 26, 2000

[54] BRAKE LINE CAPTURED BAND CLAMP

[75] Inventors: Ronald A. Drake, White Lake; Nickolas J Ristich, Waterford, both of Mich.

[73] Assignee: General Motors Corporation, Detroit, Mich.

[21] Appl. No.: 09/186,317

[22] Filed: Nov. 4, 1998

[51] Int. Cl.[7] ............................ B65D 63/00; F16L 3/13
[52] U.S. Cl. ........................ 248/74.3; 24/339; 24/16 PB
[58] Field of Search ..................... 248/67.5, 67.7, 248/74.1, 74.5, 229.1–229.26, 230.1–230.9, 316.1, 316.7; 24/336, 337, 326, 376, 464, 489, 543, 562, 271, 20 TT, 16 PB, 30.5 R, 30.5 P

[56] References Cited

U.S. PATENT DOCUMENTS

| | | | |
|---|---|---|---|
| 3,913,187 | 10/1975 | Okuda | 248/74.3 |
| 4,840,345 | 6/1989 | Neil et al. | 248/74.2 |
| 4,881,301 | 11/1989 | Sweeney et al. | 24/30.5 R |
| 5,024,405 | 6/1991 | McGuire | 248/74.1 |
| 5,118,215 | 6/1992 | Freier | 248/74.2 |
| 5,367,750 | 11/1994 | Ward | 248/74.3 |
| 5,423,501 | 6/1995 | Yu | 248/74.1 |
| 5,590,859 | 1/1997 | Lord | 248/74.2 |
| 5,725,185 | 3/1998 | Auclair | 248/74.2 |
| 5,775,653 | 7/1998 | Horney et al. | 248/74.3 |
| 5,806,819 | 9/1998 | Martone | 248/74.3 |
| 5,937,488 | 8/1999 | Geiger | 248/74.3 |

*Primary Examiner*—Ramon O. Ramirez
*Assistant Examiner*—Jon Szumny
*Attorney, Agent, or Firm*—Jeffrey A. Sedlar

[57] ABSTRACT

A band clamp for capturing a tubular member, e.g., brake line of a motor vehicle, is presented, wherein the band clamp is adapted to be mounted around an annular object, e.g., an axle assembly of the motor vehicle. In an exemplary embodiment, the clamp comprises an open-ended substantially annular band having first and second opposed primary interlockable members disposed at the open ends thereof. The clamp further includes first and second cooperating, opposed secondary interlockable members disposed within the annular band between the open ends. The first and second secondary interlockable members provide complementary engaging surfaces extending a predetermined distance from the annular band for securing the tubular member to the clamp.

11 Claims, 5 Drawing Sheets

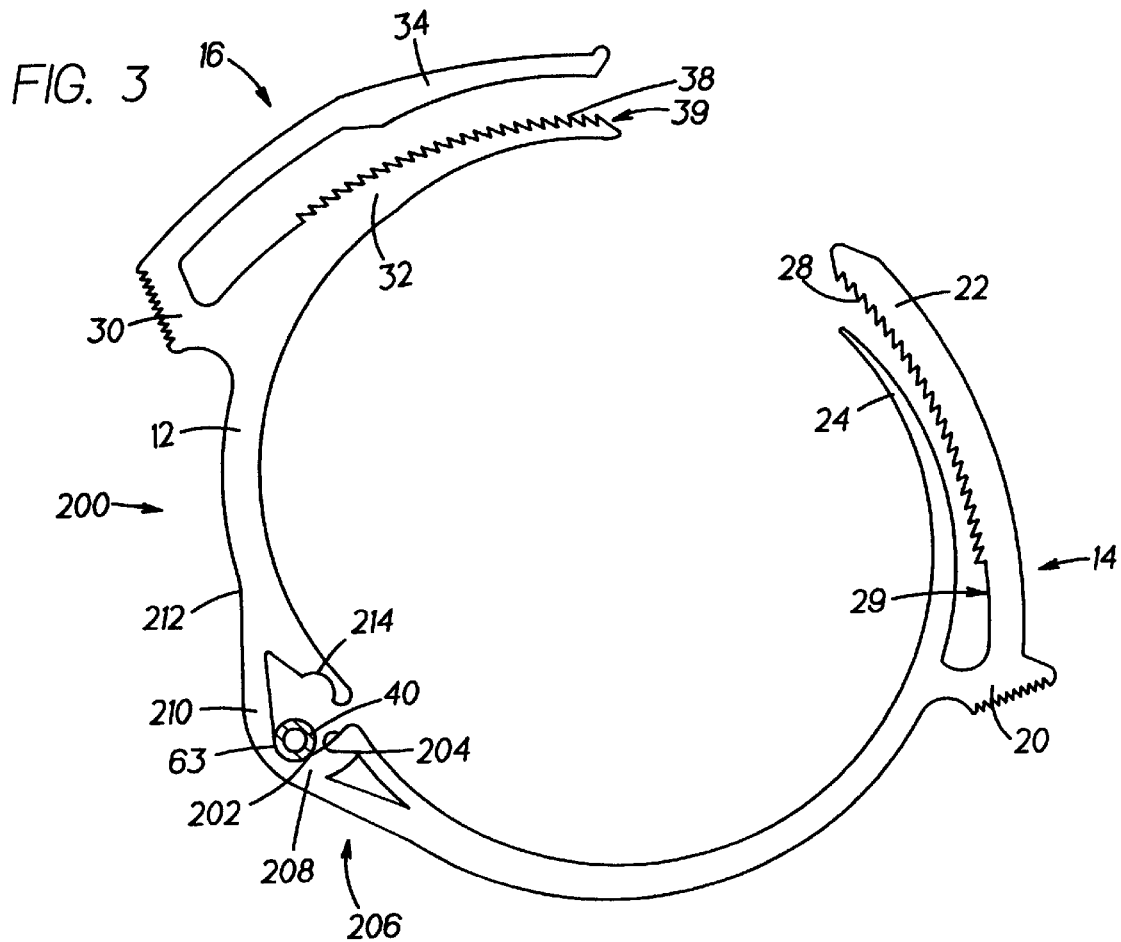
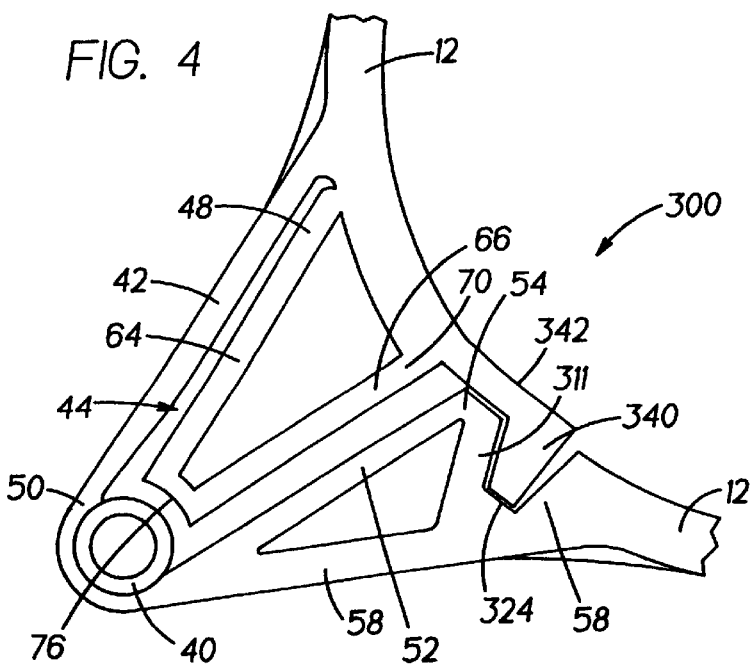

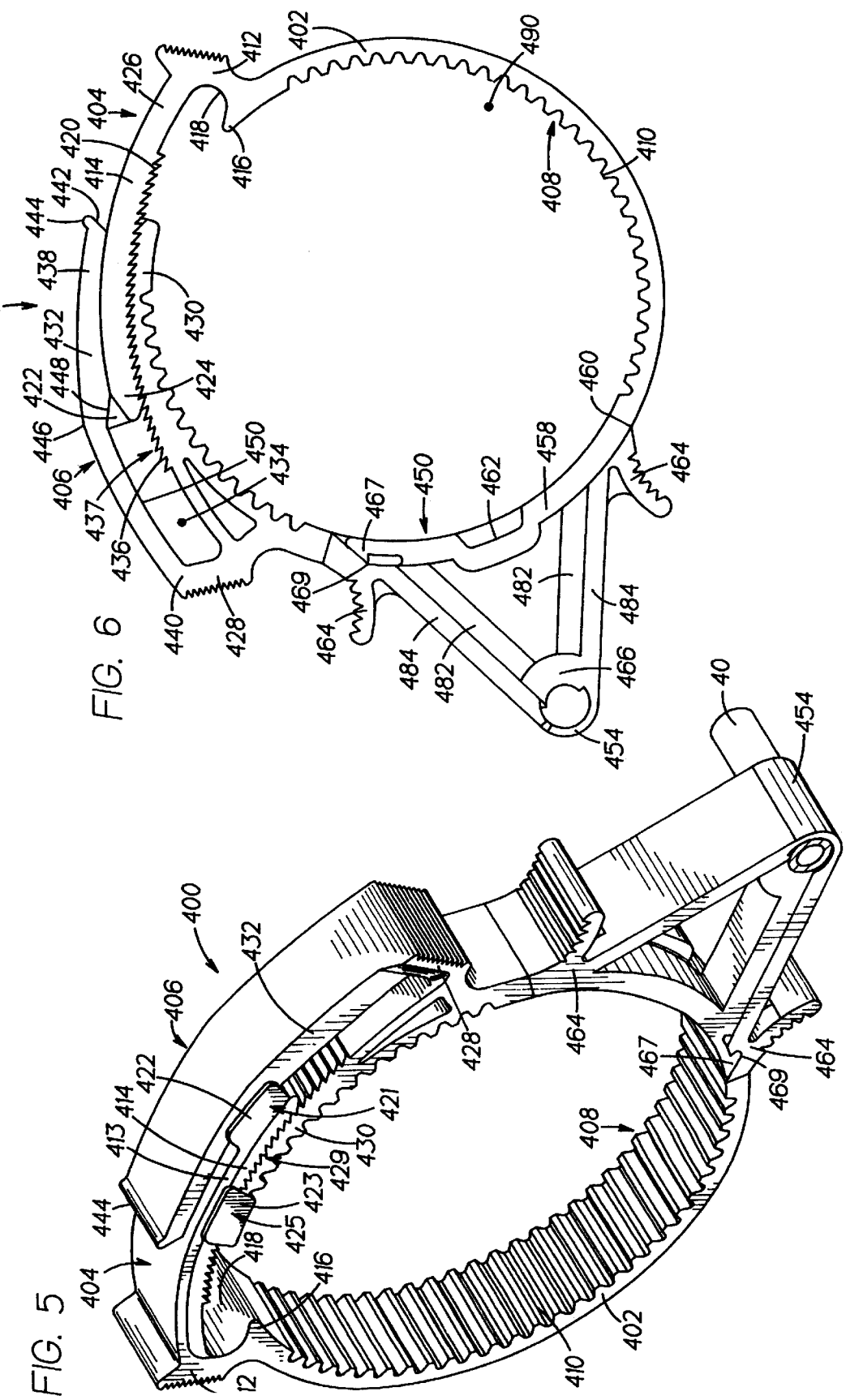

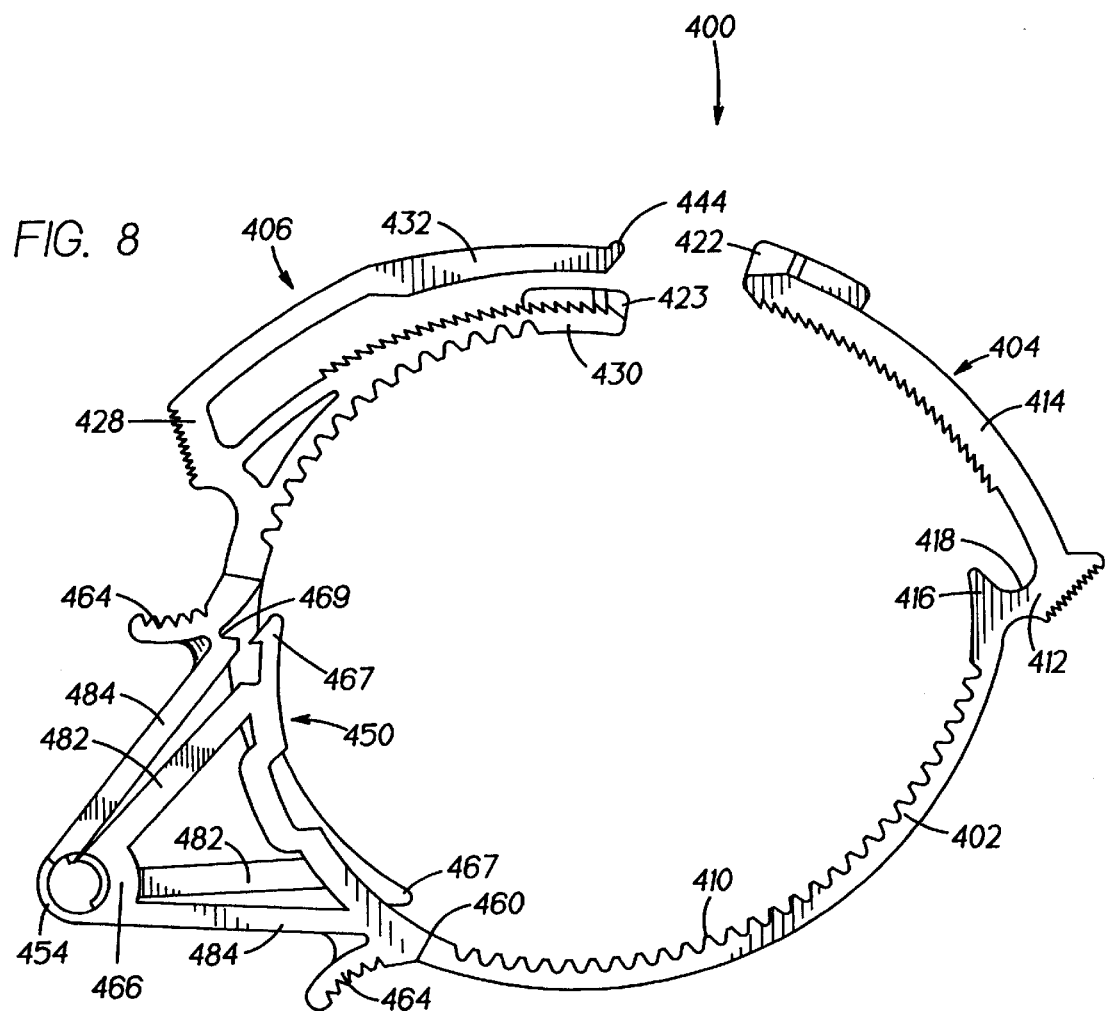

BRAKE LINE CAPTURED BAND CLAMP

TECHNICAL FIELD

The present invention relates generally to adjustable clamping devices. More particularly, the present invention relates to a snap-fit adjustable band clamp for receiving and securely capturing a brake line.

BACKGROUND OF THE INVENTION

Brake lines comprising a variety of materials have been used for many years in automobile vehicles to transport brake fluid in an automotive brake system. Typically, the brake line is formed of a durable tubing material which is suitable for carrying the brake fluid under operating conditions of the automobile, including extreme testing conditions, e.g., high pressure and a diverse temperature environment. As is known in the art, the braking system includes a master cylinder connected to a number of brake lines which connect individual braking assemblies at each wheel to the master cylinder. Disposed within the master cylinder is brake fluid which is forced through the brake lines into the individual braking assemblies at the car wheels under action of a piston in the master cylinder. This piston actuates the braking assemblies to provide a stopping force. If the motor vehicle contains an antilock brake system, the brake fluid flows from the master cylinder to an electronic brake control module which regulates pulses to the braking assemblies at each wheel depending upon information from the antilock brake system. One of the brake lines of the braking system conventionally runs between the braking assemblies of the rear wheels of an automobile, truck, or the like along the rear axle. Typically, an axle clip assembly is used to secure the brake line to the rear axle to limit undesired movement of the brake line along the rear axle and to route the brake line according to a desired path. The axle clip assembly generally includes a steel clip member welded directly onto the axle along with a bracket subassembly for securing the brake line to the axle. In addition, an armor wrap is preferably applied in the axle clip assembly for protecting the brake line in the area where the brake line contacts the welded axle clip assembly and is routed along the axle itself. To properly align and secure the brake line to the axle, a plurality of these axle clip assemblies are spaced along the axle by welding the same at predetermined locations.

Because the conventional clip assemblies are directly welded onto the axle assembly, the process involves a series of steps at both the axle manufacturer and assembly operations, including the welding process. The number of steps involved in the manufacturing and assembly processes increases the overall complexity of securing the brake line along the axle assembly. Because the welded clip assemblies are spaced apart at a predetermined distance along the axle, the location of the clips is set and is not easily adaptable to change, where necessary or desired.

SUMMARY OF THE INVENTION

The present invention comprises a band clamp for securely capturing a motor vehicle brake line. In an exemplary embodiment, the clamp includes an open-ended substantially annular band having a pair of integral, opposed primary interlockable members disposed at its open ends for mounting to an axle assembly. Primary interlockable members comprise first and second complementary members, each including an arcuate jaw having a plurality of teeth adapted for interconnecting engagement with the opposite, cooperating primary interlockable member. The complementary jaws are securely maintained in an interlocking position by providing resilient biasing members, e.g., a tongue, at the open ends of the clamp.

The clamp also includes a pair of complemental, integral, opposed secondary interlockable members for securely capturing a brake line in a snap-fit manner. The secondary interlockable members are integrally formed within the clamp between its open ends and permit the insertion of the brake line into an arcuate channel which is adapted to receive and seat against a lower portion of the brake line. The brake line is captured by interconnectingly engaging the secondary interlockable members in a snap-fit manner, whereby an arcuate surface of the secondary interlockable members seats against the brake line resulting in the secure capture of the brake line by the secondary interlockable members.

The band clamp of the present invention provides an attractive, effective alternative to the conventional axle clip assemblies for securing the brake line to the axle assembly. In accordance with the present invention, the band clamp provides a single point contact and alignment of the brake line to the axle assembly and aids in the assembly process of the motor vehicle as a result of a reduction in handling complexity at both the axle manufacturer and the assembly operations.

The above-described and other features and advantages of the present invention will be appreciated and understood by those skilled in the art from the following detailed description, drawings, and appended claims.

BRIEF DESCRIPTION OF THE DRAWINGS

The present invention will now be described by way of example with reference to the following Figures, in which:

FIG. 3 is a side elevation view of a clamp similar to FIG. 1 illustrating the clamp in an open position;

FIG. 4 is a partially fragmented enlarged side elevation view of a clamp similar to FIG. 1 illustrating a snap-fit assembly for capturing the brake line;

FIG. 5 is a perspective view of a second embodiment of the captured band clamp in accordance with the present invention shown in a closed position;

FIG. 6 is a side elevation view of the clamp shown in FIG. 5;

FIG. 8 is a side elevation view of the clamp shown in FIG. 5 illustrating the clamp capturing a brake line in snap-fit manner.

DETAILED DESCRIPTION OF THE INVENTION

Figure 1:
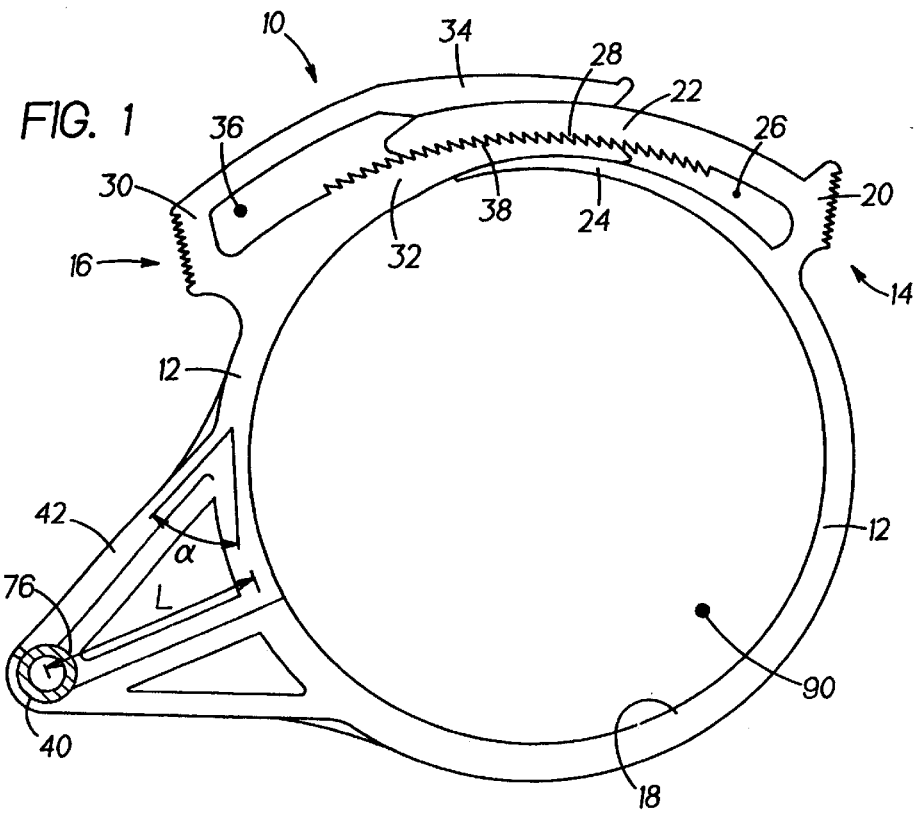
FIG. 1 is a side elevation view of a first embodiment of a captured band clamp in accordance with present invention illustrating an extended reach clamp in a closed position.
Figure 2:
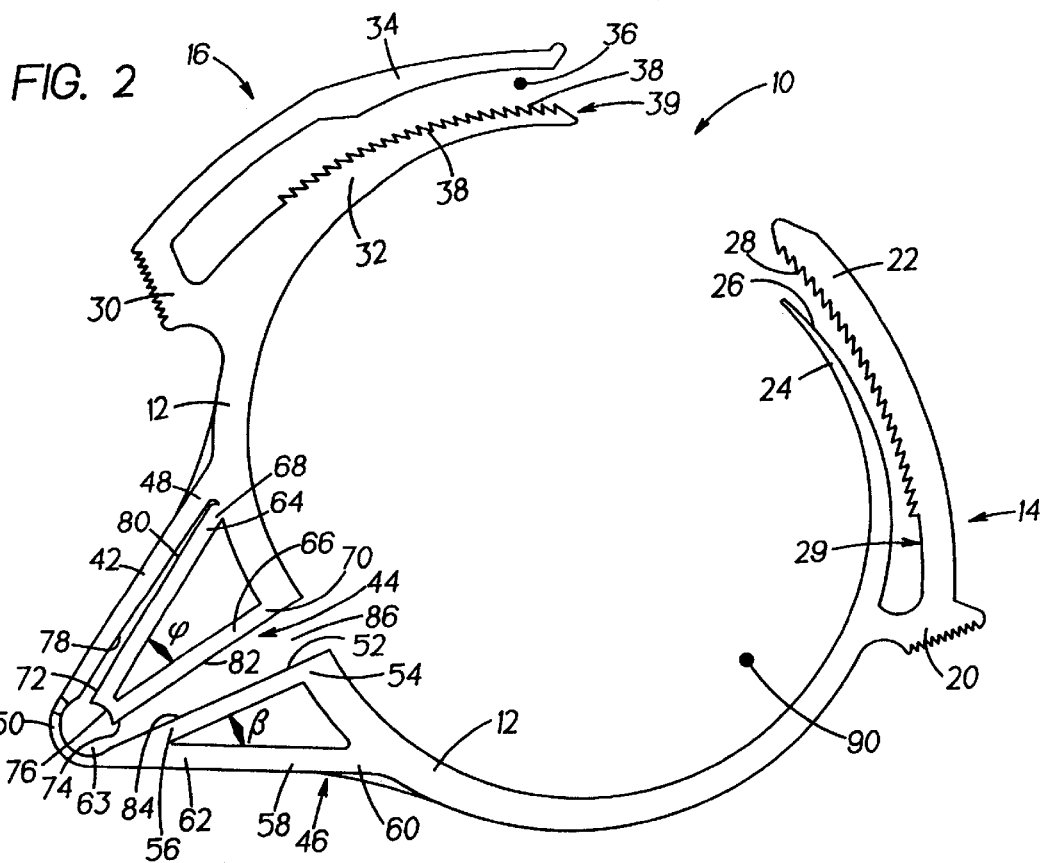
FIG. 2 is a side elevation view of the clamp shown in FIG. 1 illustrating the clamp in an open position.

Referring to FIGS. 1 and 2, a first embodiment of a brake line captured band clamp according to the present invention is generally designated by reference numeral 10. Clamp 10 includes an open-ended, substantially annular band 12 having a pair of integral, opposed interlockable members 14 and 16 disposed at its open ends for securing to a support structure of a motor vehicle, such as the rear axle. Clamp 10 has a substantially smooth inside surface 18 extending along the entire length of band 12.

The first interlockable member 14 includes a support portion 20, an arcuate jaw 22, and a resilient biasing tongue 24. Arcuate jaw 22 and resilient biasing tongue 24 are supported in a cantilevered manner from support portion 20 and resilient biasing tongue 24 is preferably disposed radially inward from and substantially parallel to arcuate jaw 22 so that an opening 26 is formed therebetween. Arcuate jaw 22 includes a plurality of parallel saw-toothed projections or teeth 28 disposed on an inner surface 29 of arcuate jaw 22 and project toward resilient biasing tongue 24. Teeth 28 on arcuate jaw 22 provides interconnecting engagement with cooperating interlockable member 16 upon being interconnected around an annular object (not shown) which is captured within an opening 90 defined by band 12 and to which clamp 10 is securely mounted thereto.

The second interlockable member 16 is similar to interlockable ember 14 but is orientated complementary to interlockable member 14, wherein interlockable member 16 has a support portion 30, an arcuate jaw 32 and a resilient biasing tongue 34. Arcuate jaw 32 and resilient biasing tongue 34 are supported in a cantilevered manner from support portion 30 and resilient biasing tongue 34 is preferably disposed radially outward from and substantially parallel to arcuate jaw 32 so that an opening 36 is formed therebetween. Arcuate jaw 32 includes a plurality of parallel saw-toothed projections or teeth 38 adapted for interconnecting engagement with cooperating interlockable member 14 upon being interconnected around a substantially annular object (not shown). Teeth 38 are formed along an outer surface 39 of arcuate jaw 32 and project toward resilient biasing tongue 34. The teeth 38 are complementary in dimension and number to teeth 28 to provide an interlocking connection therebetween by orientating teeth 38 in an opposite direction of teeth.

As shown in FIGS. 1 and 2, clamp 10 also includes a means for capturing a conventional automotive or truck brake line 40, which generally comprises an annular tube or the like. Integrally formed within band 12 is a first structural arm 42, an intermediate structural arm member 44, and a second structural arm 46. First structural arm 42 extends outwardly from band 12. In a closed position, as shown in FIG. 1, first structural arm 42 is disposed at a predetermined angle α in relation to closed annular band 12, wherein first arm 42 has a first end 48 which is integral with band 12 and a second end 50 extending outwardly from band 12. Second tangential structural arm 46 comprises an inner arm 52 and an outer arm 58, wherein inner arm 52 has a first end 54 integrally formed with annular band 12 and a second end 56 extending outwardly from annular band 12. Similar to inner arm 52, outer arm 58 includes a first end 60 integral with annular band 12 and a second end 62 extending outwardly from annular band 12. Inner arm 52 and outer arm 58 are spaced apart from one another whereby a generally triangular opening is formed by and disposed between inner arm 52, outer arm 58 and a portion of annular band 12 which is located between first ends 54 and 60. Consequently, second ends 56 and 62 of inner arm 52 and outer arm 58, respectively, converge with one another to form a single unitary arm and an angle β is formed between second ends 56 and 62 as the same converge. The single unitary arm formed by the convergence of second ends 56 and 62, integrally connects with second end 50 of first structural arm 42 in an arcuate manner to form an arcuate channel 63 for receiving brake line 40.

Intermediate structural arm member 44 comprises a generally triangular shaped member having a first arm 64 and a second arm 66, both of which are integrally connected with annular band 12 at first ends 68 and 70, respectively. First arm 64 and second arm 66 include second ends 72 and 74, respectively, which converge with one another to form a generally triangular opening between first arm 64, second arm 66 and the portion of annular band 12 which extends between first ends 68 and 70. An angle γ is formed between second ends 72 and 74 as the same converge to form an arcuate surface 76 (engaging surfaces) which is intended to complementarily seat against and secure brake line 40 when clamp 10 is in the closed position of FIG. 1.

As illustrated in FIGS. 1 and 2, a first surface 78 of first tangential arm 42 contacts and forms a butt joint with a first surface 80 of first arm 64; and a first surface 82 of second tangential arm 66 contacts and forms a butt joint with a first surface 84 of inner arm 52 when clamp 10 is in the closed position shown in FIG. 1. In the open position, illustrated in FIG. 2, an opening 86, formed between first surfaces 82 and 84, permits brake line 40 (not shown) to be properly positioned within arcuate channel 63 prior to closing clamp 10, as will be described in more detail hereinafter.

As illustrated in FIG. 1, clamp 10 is brought into a closed clamping position about a brake line 40 by first disposing brake line 40 within arcuate channel 63 and intermediate arm member 44 is positioned and moved so that the butt joint results between first surfaces 78 and 80 and between first surfaces 82 and 84. Intermediate arm member 44 is pivotable and upon closing clamp 10 by interengaging interlockable members 14 and 16, arcuate surface 76 engages brake line 40. As a result, arcuate surface 76 seats against brake line 40 and brake line 40 is successfully, annularly captured and secured by arcuate channel 63 and arcuate surface 76.

Figure 7:
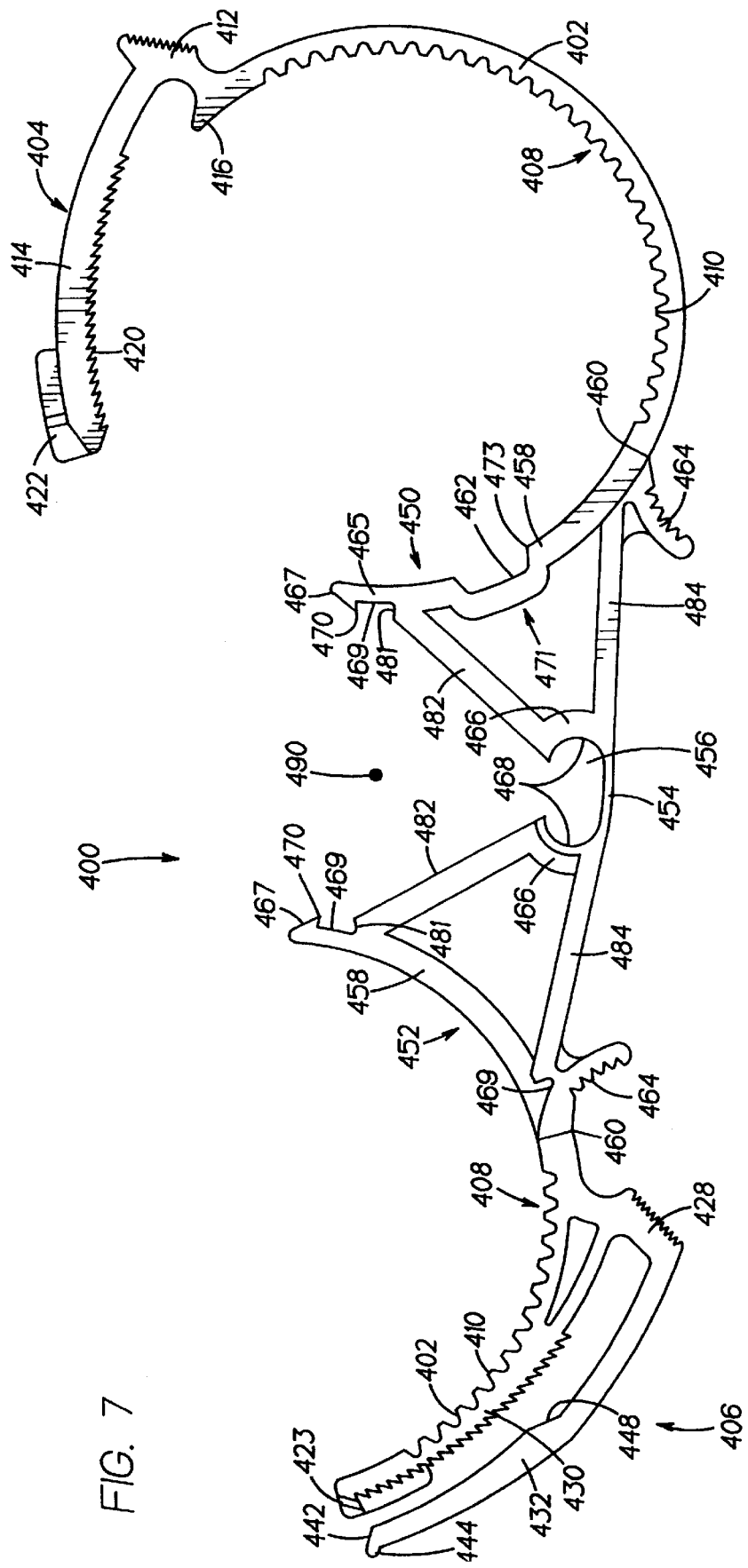
FIG. 7 is a side elevation view of the clamp shown in FIG. 5 illustrating the clamp in an open position.

To secure clamp 10 around the axle assembly after brake line 40 has been captured and secured within arcuate channel 63, as previously described, clamp 10 is placed in an open non-clamping position, as illustrated in FIG. 2, so that it encircles the axle assembly. The free ends of the opposed interlockable members 14 and 16 are then brought together in proper alignment as described hereinbefore, and pressure is applied to support portions 20 and 30 to force the opposed interlockable members 14 and 16 together and interengage teeth 28 and 38. In accordance with the present invention, support portions 20 and 30 may include serrated surfaces, as shown in FIG. 7, and conventional hand tools may be used to maximize the force exerted by clamp 10 on brake line 40 to ensure that brake line 40 is effectively and securely clamped to the axle assembly. By forcing interlockable members 14 and 16 together to interengage teeth 28 and 38, a continuous annular band 12 is formed and intermediate arm member 44 is directed toward brake line 40 resulting in annular securing member 76 seating against brake line 40, whereby annular securing member 76 abuts first surfaces 78 and 84 resulting in brake line 40 being completely encircled and captured by annular securing member 76 and annular channel 63.

More specifically, the jaws 22 and 32 are received within openings 26 and 36, respectively, thereby vertically offsetting jaws 22 and 32 from one another with teeth 28 interlocking with teeth 38. The size of jaws 22 and 32 and the spacing of the openings 26 and 36 are such that resilient biasing tongues 24 and 34, which are disposed around the interengaged jaws 22 and 32, provide opposing biasing forces against jaws 22 and 32 to positively interengage teeth 28 and 38. More specifically, tongue 24 provides a radially outwardly biasing force against corresponding jaw 32 and tongue 34 provides a radially inwardly biasing force against corresponding jaw 22.

Clamp 10, as shown in FIGS. 1 and 2, comprises an extended reach clamp intended for use when it is desired to capture brake line 40 within clamp 10 so that brake line 40 is disposed and secured at a predetermined distance L from the annular object, e.g. automotive axle, to which clamp 10 and more particularly band 12 is mounted to and encircles.

One of skill in the art would appreciate that the distance L as measured from the axle assembly to the captured brake line 40 may be varied depending upon the specific application and the desired location of brake line 40 in relation to annular band 12. Accordingly, it is within the scope of the invention that the distance L may be varied according to the desired application of clamp 10 to thereby vary the reach of clamp 10.

Referring to FIG. 3 which illustrates a modification of the brake line captured band clamp 10 of FIG. 1, wherein a limited reach brake line captured band clamp is generally designated 200 and shown in an open position. Limited reach clamp 200 is similar to clamp 10; however, clamp 200 is intended for use when it is desired to secure brake line 40 adjacent to and at a predetermined distance from the axle assembly.

Limited reach clamp 200 secures brake line 40 within an arcuate channel 63 formed by a shoulder 202 which comprises a portion of an inner surface 204 of a first arm 206 which is integrally connected with annular band 12 and which extends outwardly therefrom to a second end 208. Arcuate channel 63 is also formed in part by a second arm 210 which is integrally connected at a first end 212 to annular band 12 and integrally connects at an opposite end with second end 208 of first arm 206 to form arcuate channel 63. An arcuate surface 214 (engaging surfaces) is provided to seat against brake line 40 upon the closing of clamp 200, wherein arcuate surface 214 comprises a cantilevered portion of annular band 12 which forms an arm when clamp 200 is in the open position shown in FIG. 3. When clamp 200 is closed, arcuate surface 214 is directed toward arcuate channel 63 and more importantly arcuate surface 214 is arcuate in nature and complementarily seats against an upper portion of arcuate brake line 40 resulting in brake line 40 being completely captured and secured by arcuate surface 214 and arcuate channel 63.

Referring now to FIG. 4, an alternative embodiment of the clamp 10 of FIG. 1 is generally designated by reference numeral 300. FIG. 4 is a side view illustrating the alternative embodiment of clamp 300 in a partially open position just prior to the closing of clamp 300, wherein the means for capturing and securing brake line 40 includes snap-fit locking means. Angularly disposed between inner arm 52 and outer arm 58 is a connecting beam 311 integrally connected therebetween. Connecting beam 311 is integral with first end 54 of inner arm 52 and forms a recess 324 between interconnecting beam 311 and outer arm 58. Recess 324 is receptive to a similarly shaped protrusion 340 extending from intermediate structural member 44 resulting in the snap-fastening of intermediate structural member 44 when opposing interlockable members 14 and 16 (not shown) are interengaged to close clamp 300. More specifically, protrusion 340 extends outwardly from first end 70 of second arm 66 and has an inner surface 342 which comprises a portion of annular band 12 when clamp 300 is closed. The snap-fastening feature of clamp 300 permits brake line 40 to be securely captured within clamp 300 and the easy mounting and disengagement of interlockable members 14 and 16 (shown in FIGS. 1–3) allow clamp 300 to be mounted at a predetermined location on the axle assembly, and importantly, clamp 300 is freely rotatable around the axle assembly which permits the user to position brake line 40 in a greater number of locations along the axle assembly.

Referring to FIGS. 5 and 6, a second embodiment of a brake line captured band clamp according to the present invention is generally designated by reference numeral 400. Clamp 400 includes an open-ended substantially annular band 402 having a pair of integral, opposed primary interlockable members 404 and 406 disposed at its open ends for mounting to an axle assembly. Clamp 400 also includes a pair of complemental, integral, opposed secondary interlockable members 450 and 452 for securely capturing brake line 40, wherein secondary members 450 and 452 are integrally formed within clamp 400 between its open ends, as described hereinafter. A substantial portion of a radially inwardly facing inner surface 408 of clamp 400 is serrated, as shown by reference numeral 410. The first interlockable member 404 includes a support portion 412, an arcuate jaw 414 and a nub 416 which is disposed radially inward from and substantially parallel to arcuate jaw 414 so that an arcuate recess 418 is formed therebetween. Arcuate jaw 414 is supported in a cantilevered manner from support portion 412 and arcuate jaw 414 includes a plurality of parallel saw-toothed projections or teeth 420 adapted for interconnecting engagement with cooperating interlockable member 406 upon being interconnected around a substantially annular object, e.g., automotive axle assembly, which is captured within opening 490, and to which clamp 400 is securely mounted thereto. Arcuate jaw 414 further includes a tab 422 integrally formed therein and extending outwardly from an outer edge 413 of arcuate jaw 414 at a first end 424, wherein first end 424 is opposite a second end 426 of arcuate jaw 414 which is integrally connected to support portion 412. Upon the interconnecting engagement of interlockable members 404 and 406, tab 422 seats against resilient biasing tongue 432 and prevents lateral disengagement of second interlockable member 406 from first interlockable member 404. Tab 422 has an outer surface 421 which is suitable for displaying the identification of a vendor.

The second interlockable member 406 includes a support portion 428, an arcuate jaw 430, and a resilient biasing tongue 432. Arcuate jaw 430 and resilient biasing tongue 432 are supported in a cantilevered manner from support portion 428 and resilient biasing tongue 432 is disposed radially outward from and is substantially parallel to arcuate jaw 430 so that an opening 434 is formed therebetween. Arcuate jaw 430 includes a plurality of parallel saw-toothed projections or teeth 436 adapted for interconnecting engagement with cooperating first interlockable member 404 upon being interconnected. Teeth 436 are formed along an outer surface 437 of arcuate jaw 430 and project toward resilient biasing tongue 432. The teeth 436 are similar in dimension and number to teeth 420 but have a reverse orientation to provide interlocking capability. Similarly, arcuate jaw 430 includes a tab 423 integrally formed therein and extending outwardly from an outer edge 429 of jaw 430. Tab 423 seats against arcuate jaw 414 when arcuate jaws 430 and 414 interlock and tab 423 prevents lateral disengagement of arcuate jaw 414 from arcuate jaw 430. Tab 423 includes an outer surface 425 which is suitable for displaying the identification of a vendor.

Resilient biasing tongue 432 has a first end 438 and a second end 440, wherein second end 440 is integrally connected to support portion 428 and first end 438 extends outwardly from support portion 428. First end 438 has a beveled surface 442 which projects outward to form a second lip 444 on an outer surface 446 of resilient biasing tongue 432.

As illustrated in FIGS. 6 and 7, secondary interlockable members 450 and 452 interconnectingly engage one another to capture and secure brake line 40. A contiguous resilient portion 454 connects secondary interlockable members 450 and 452 and more broadly permits the formation of annular band 402 upon capture of brake line 40 by the snap-fitting engagement of secondary interlockable members 450 and 452 and upon first and second interlockable members 404 and 406 interconnectingly engaging one another.

FIG. 7 illustrates clamp 400 in an open position and furthermore, secondary interlockable members 450 and 452 are shown in an opposing open position, wherein an opening 490 is created between the open secondary interlockable members 450 and 452. Opening 490 permits brake line 40 to be inserted between members 450 and 452 and captured by same upon the interlocking, snap-fit action.

Contiguous resilient portion 454 defines a part of an annular opening 456 upon the interconnecting engagement of secondary interlockable members 450 and 452. First secondary interlockable member 450 includes a first arcuate member 458 that forms a portion of annular band 402, wherein first arcuate member 458 integrally connects with serrated inner surface 410 of inner surface 408 at a point 460. First arcuate member 458 includes a recess 462 on an inner surface 473 to provide a positive location feature to radially position brake line 40 on the axle assembly. Proximate integral point 460, secondary member 450 includes a gripping element 464 for directing and forcing secondary member 450 into interconnecting engagement with complementary secondary member 452. An outer end 465 of first arcuate member 458 comprises a cantilevered arm having a beveled lip 467 extending outward therefrom, wherein beveled lip 467 is formed in part by a shoulder 470 of a recess 469 formed on an outer surface 471 of first arcuate member 458. Beveled lip 467 engages a similarly shaped recess 469 formed in the complementary secondary interlockable member 452 resulting in a snap-fit interlocking engagement of secondary member 450 and 452 upon capture of brake line 40, as will be described in greater detail hereinafter. Recess 469 is also defined by an edge 481 of a first structural beam 482 which is integrally connected between support element 464 at first arcuate member 458 and a second arcuate member 466 at an opposite end.

Second arcuate member 466 is disposed radially outward from and substantially parallel to first arcuate member 458 and has an outer arcuate surface 468 (engaging surface) that contacts and seats against brake line 40 upon the interconnecting engagement of secondary members 450 and 452. Similar to and opposing first structural beam 482 is a complementary second structural beam 484 integrally connected to and extending between first arcuate member 458 and second arcuate member 466, wherein beams 482 and 484 extend outwardly from first arcuate member 458 and angularly converge inward to integrally connect with second arcuate member 466 and form second arcuate member 466.

The second interlockable member 452 is similar to first interlockable member 450 but is orientated complementary to first interlockable member 450, with similar components being numbered alike in the Figures. Unlike the corresponding first arcuate member 458 of first secondary interlockable member 450, the inner surface 473 of first arcuate member 458 of second secondary interlockable member 452 is substantially smooth and free from irregularities. Thus, recess 462 is eliminated in first arcuate member 458 of second secondary interlockable member 452.

Thus, contiguous resilient portion 454 comprises a resilient extension between second structural beams 484 of secondary interlockable members 450 and 452. Contiguous portion 454 is adapted to receive brake line 40 and along with second arcuate members 466, contiguous resilient portion 454 encircles and securely captures brake line 40 when secondary interlockable members 450 and 452 engage one another in a snap-fit manner.

Clamp 400 provides a simple, straightforward, method of securing brake line 40 that affords a secure "capture" of the as the "primary" interlockable members 404 and 406 interconnectingly engage one another. Secondary interlockable members 450 and 452 work in unison with the primary interlockable members 404 and 406 and secondary members 450 and 452 have sufficient rigidity/strength so as to securely contain/capture brake line 40 and prevent undesired movement thereof.

As illustrated in FIGS. 6–8, clamp 400 is brought into a closed clamping position about brake line 40 by first disposing brake line 40 within opening 490 and directing brake line 40 to seat against contiguous portion 454 and between second arcuate members 466. Brake line 40 is securely captured by interconnectingly engaging secondary members 50 and 452 by bringing the gripping elements 466 together in proper alignment and the serrated surface thereon provides a convenient gripping surface to permit the user to easily snap-fasten opposed interlockable members 450 and 452 together and capture brake line 40. Tab 422 of arcuate jaw 414 and tab 423 of arcuate jaw 430 prevent lateral disengagement of the primary interlockable members 404 and 406 during application and use of clamp 400.

When secondary members are interengaged in such a clamping position capturing brake line 40, beveled lip 467 of first secondary member 450 engages similarly shaped recess 469 in second secondary member 452 and interlocks therewith in a snap-fit manner. In a similar manner, beveled lip 467 of second secondary member 452 engages similarly shaped recess 469 in first secondary member 450 and interlocks therewith in a snap-fit manner. FIG. 8 shows clamp 400 and more particularly first secondary interlockable member 450 in a position just prior to being securely interlocked with second secondary interlockable member 452 in a snap-fit manner. More specifically, the snap-fit fastening process comprises engaging beveled lips 467 with recesses 469. The snap-fitting engagement of secondary members 450 and 452 effectively and securely captures brake line 40 by encircling the same with interlocking structural members.

The open ends of clamp 400 are brought into a complete closed position by interengaging the primary interlockable members 404 and 406 by applying pressure to support portions 412 and 428 to force the opposed interlockable members 404 and 406 together and interengage teeth 420 and 436. By providing serrated surfaces on support elements 412 and 428 (as shown in FIGS. 5–8), the user may increase the force exerted by clamp 400 on the axle assembly. When the primary interlockable members 404 and 406 are interengaged in such a clamping position, jaw 414 is received in opening 434 thereby vertically off-setting jaws 414 and 430 from one another with teeth 420 interlocking with teeth 436. The size of jaws 414 and 430 and the spacing of opening 434 are such that resilient biasing tongue 432 and jaw 430 provide opposing biasing forces against jaw 414 to positively interengage teeth 420 and 436. In addition, as jaw 414 is interengaged with jaw 430, first lip 422 of arcuate jaw 414 seats against beveled shoulder 448. Additional details with respect to the manner of interlockingly engaging primary interlockable members 404 and 406 has previously been described hereinbefore with reference to FIGS. 1–8.

In accordance with the present invention, an attractive and effective alternative to conventional metal clip apparatus for securing a conventional brake line along an axle assembly is presented. Advantageously, clamp 400 provides single point contact and alignment of brake line 40 to the axle assembly and aids in the assembly process of a motor vehicle because brake line 40 can be securely retained by clamp 400 while other fittings are being connected by a worker. Accordingly, the use of clamp 400 reduces handling complexity at both the axle manufacturer and assembly operations and provides a method of securing brake lines composed of a vast number of different materials, including nylon coated brake lines. Moreover, clamp 400 allows for some tolerance variations of axle to brake line variations.

It will be understood that a person skilled in the art may make modifications to the preferred embodiments shown herein within the scope and intent of the claims. While the present invention has been described as carried out in specific embodiments thereof, it is not intended to be limited thereby but is intended to cover the invention broadly within the scope and spirit of the claims.

What is claimed is:

1. A clamp for securely capturing a tubular member, comprising:

an open-ended substantially annular band having first and second opposed primary interlockable members disposed at the open ends thereof, said first primary interlockable member including a first support element, a first arcuate jaw and a first resilient biasing member extending from said first support element, said first arcuate jaw having a plurality of teeth adapted for interconnecting engagement of said first and second secondary interlockable members, said second primary interlockable member including a second support element, a second arcuate jaw and a second resilient biasing member extending from the second support element, said second arcuate jaw having a plurality of teeth adapted for interconnecting engagement of said first and second secondary interlockable members, and first and second cooperating, opposed secondary members disposed within said annular band between said open ends for securing said tubular member to said clamp, said first secondary member including a first structural arm having a first end and including two intermediate arms extending from said first structural arm forming an arcuate surface at their ends;

said second secondary member including a second structural arm having a second end; said first and second ends forming an arcuate channel adapted to cooperate with said arcuate surface to capture said tubular member;

wherein said second structural arm forms a butt joint with one of said two intermediate arms upon closing said clamp by interconnectingly engaging said first and second primary interlockable members.

2. The clamp as set forth in claim 1 wherein said second resilient biasing member comprises:

a cantilevered tongue extending outwardly from said second support element, said cantilevered tongue producing a force against said first arcuate jaw of said first primary interlockable member to maintain said teeth of said first and second arcuate jaws in interlocking engagement.

3. The clamp as set forth in claim 1 wherein upon closing said clamp by interconnectingly engaging said first and second primary interlockable members, said first structural arm, said two intermediate arms and said second structural arm are adapted to capture said tubular member therebetween.

4. The clamp as set forth in claim 1 wherein said first cooperating, opposed secondary member includes a protrusion extending from said first structural arm, for engaging a recess defined by said second structural arm of said second cooperating, opposed secondary member for securing said tubular member to said clamp.

5. The clamp as set forth in claim 1 wherein said arcuate surface draws said tubular member toward said arcuate channel when said open ends are closed.

6. The clamp as set forth in claim 1 wherein said resilient biasing member comprises:

a cantilevered tongue extending outwardly from said first support element, said cantilevered tongue producing a force against said second arcuate jaw of said second primary interlockable member to maintain said teeth of said first and second arcuate jaws in interlocking engagement.

7. The clamp as set forth in claim 1 wherein said first secondary interlockable member includes a first arm member having a first lip for engagement with a similarly shaped first recess formed in said second secondary interlockable member to provide snap-fitting engagement therebetween.

8. The clamp as set forth in claim 1 wherein engaging surfaces of said first and second secondary interlockable members are interconnected.

9. The clamp as set forth in claim 1 wherein said first arcuate jaw includes a first tab extending outwardly from an outer edge of said first arcuate jaw, wherein said first tab is disposed adjacent said second arcuate jaw of said second primary interlockable member when said first and second primary interlockable members are interlockingly engaged, said first tab preventing lateral disengagement of said second arcuate jaw from said first arcuate jaw.

10. The clamp as set forth in claim 1 wherein said second arcuate jaw includes a second tab extending outwardly from an outer edge of said second arcuate jaw, wherein said second tab is disposed adjacent said resilient biasing member of said first primary interlockable member when said first and second primary interlockable members are interlockingly engaged, said second tab preventing lateral disengagement of said resilient biasing member of said first primary interlockable member from said second arcuate jaw of said second primary interlockable member.

11. The clamp as set forth in claim 1 wherein at least one of said first and second interlockable members further includes:

a recess on an outer surface thereof adapted to provide a positive location feature to radially position said tubular member along an axle assembly.

* * * * *